US012794315B2

(12) United States Patent
Roberts et al.

(10) Patent No.: US 12,794,315 B2
(45) Date of Patent: Nov. 10, 2026

(54) RACEWAY BEARING ASSEMBLIES FOR IN-WHEEL OUTER ROTOR ELECTRIC MOTORS

(71) Applicant: Donut Lab Development Oü, Harju maakond (EE)

(72) Inventors: Gareth Roberts, Swindon (GB); Joshua Best, Wiltshire (GB); Ville Piippo, Haarajoki (FI)

( * ) Notice: Subject to any disclaimer, the term of this patent is extended or adjusted under 35 U.S.C. 154(b) by 185 days.

(21) Appl. No.: 18/944,943

(22) Filed: Nov. 12, 2024

(65) Prior Publication Data

US 2026/0135438 A1 May 14, 2026

(51) Int. Cl.

*H02K 15/14* (2025.01)
*H02K 7/08* (2006.01)
*H02K 9/22* (2006.01)

(52) U.S. Cl.

CPC ............. *H02K 7/088* (2013.01); *H02K 9/227* (2021.01); *H02K 15/14* (2013.01)

(58) Field of Classification Search

CPC ........ F16C 33/61; F16C 33/54; F16C 33/541; H02K 7/088; H02K 7/08; H02K 5/16; H02K 5/165; H02K 5/1677; H02K 5/1737; H02K 21/22; H02K 1/2786; H02K 1/2787; H02K 1/2788; H02K 1/2789; H02K 1/279; H02K 1/2791; H02K 1/27915; H02K 1/2792

USPC .............................................................. 310/90

See application file for complete search history.

(56) References Cited

U.S. PATENT DOCUMENTS 3,478,402 A * 11/1969 Pohler .................... F16C 19/181 384/516
3,482,892 A * 12/1969 Pohler ...................... F16C 33/60 384/615
11,248,655 B2 2/2022 Dondaine et al.
2014/0252922 A1 9/2014 Ritchey et al.
2021/0075289 A1 * 3/2021 Yada ....................... H02K 3/522
2021/0190143 A1 * 6/2021 Dondaine ............... F16C 33/61
2023/0053415 A1 * 2/2023 Van Iersel ............ B60K 7/0007

FOREIGN PATENT DOCUMENTS

JP 2015132360 A * 7/2015 ............ F16C 19/381

OTHER PUBLICATIONS

Machine translation of JP-2015132360-A. (Year: 2015).*

(Continued)

*Primary Examiner* — Michael Andrews

(74) *Attorney, Agent, or Firm* — Avantech Law, LLP

(57) ABSTRACT

Raceway bearing assemblies for in-wheel outer rotor electric motors are disclosed. An example in-wheel electric motor includes a stator, a rotor, and a raceway bearing assembly. The rotor circumscribes the stator. The rotor is configured to rotate relative to the stator. The raceway bearing assembly is located between the rotor and the stator. The raceway bearing assembly includes a first inner race wire and a second inner race wire spaced apart from one another and respectively mounted on the stator, a first outer race wire and a second outer race wire spaced apart from one another and respectively mounted on the rotor, and a plurality of balls located between the first inner race wire, the second inner race wire, the first outer race wire, and the second outer race wire.

12 Claims, 7 Drawing Sheets

(56) References Cited

OTHER PUBLICATIONS

International Searching Authority, "Notification of Transmittal of the International Search Report and the Written Opinion of the International Searching Authority," issued in connection with International Patent Application No. PCT/EP2025/076826, dated Dec 4, 2025, 12 pages.

* cited by examiner

RACEWAY BEARING ASSEMBLIES FOR IN-WHEEL OUTER ROTOR ELECTRIC MOTORS

FIELD OF THE DISCLOSURE

This disclosure relates generally to electric machines and, more specifically, to raceway bearing assemblies for in-wheel outer rotor electric motors.

BACKGROUND

Electric motors typically include a stator and a rotor, with the rotor being configured to rotate relative to the stator. The stator and the rotor can be implemented in either an inner rotor configuration in which the stator circumscribes the rotor, or conversely in an outer rotor configuration in which the rotor circumscribes the stator. Electric motors are widely used across multiple industries (e.g., automotive, medical, household, etc.) and a variety of applications including vehicles, appliances, tools, fans, blowers, turbines, compressors, pumps, etc.

Electric vehicles have risen in popularity over the past decade. Electric vehicles are typically powered by one or more electric motor(s) that draw(s) electricity from an onboard rechargeable battery. Electric vehicles exist in many forms; wheeled electric vehicles, for example, include cars, vans, trucks, motorcycles, scooters, etc. that include at least one wheel powered by an electric motor. The majority of wheeled electric vehicles include powertrains having an inboard electric motor, transmission, and driveline, all of which contribute to the mass, complexity, and losses of the propulsion system, as well as a volume penalty within the chassis of the vehicle. In some implementations of a wheeled electric vehicle, the primary components of the electric motor are integrated into and/or incorporated within the wheel itself. Such implementations are commonly referred to as "in-wheel" electric motors. A key advantage of in-wheel electric motors is the ability to eliminate many if not all of the aforementioned peripheral components and the penalties associated therewith, and also to provide significant improvement in transient performance.

In-wheel electric motors typically include bearings (e.g., ball bearings) located between the rotor and the stator of the electric motor, with the bearings being configured to support and/or guide the rotation of the rotor relative to the stator. For in-wheel electric motors having an outer rotor configuration in which the rotor circumscribes the stator, the bearings have a relatively large diameter (e.g., compared to the diameter of a bearing included in an electric motor having an inner rotor configuration). Traditional deep groove ball bearings are typically standardized and come in fixed sizes and shapes, thereby limiting flexibility in design. This is specifically apparent when large diameters (e.g., greater than two hundred millimeters) are required without an increased load capacity. Furthermore, such large diameter bearings are often speed restricted, with the speed restriction being driven by heat management primarily in relation to the lubricating medium and sealing surfaces. Non-standard bearings of these dimensions are commonly either heavy and rated for much higher loads than required, or of a high cost.

Figure 1:
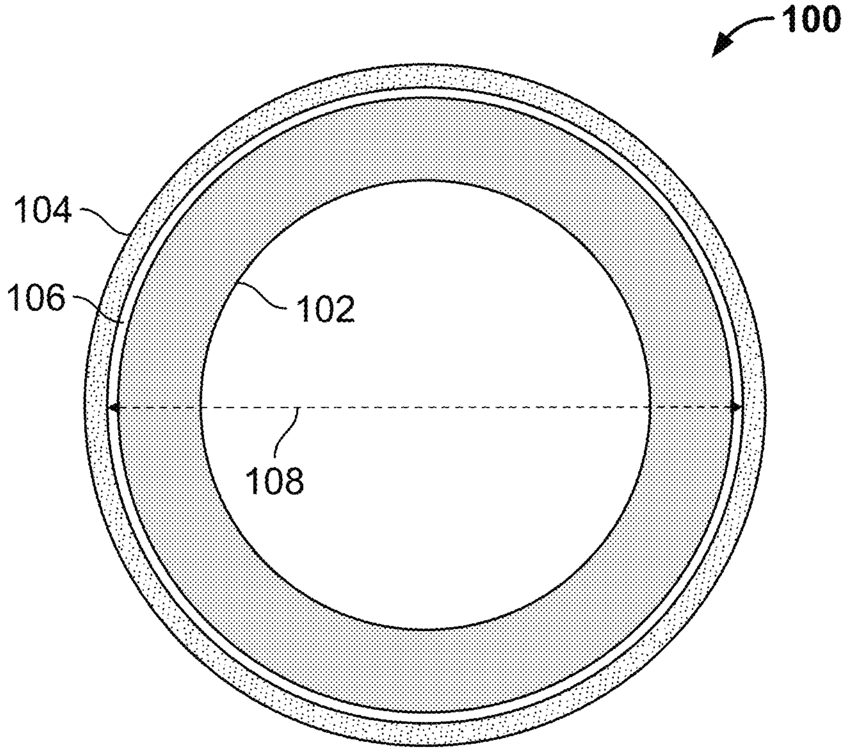
FIG. 1 is a side view of an example electric motor having an outer rotor configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Electric machines are widely used across multiple industries (e.g., automotive, medical, household, etc.) and a variety of applications including vehicles, appliances, tools, fans, blowers, turbines, compressors, pumps, etc. Example electric motors disclosed herein are configured as in-wheel electric motors for electric vehicles. An in-wheel electric motor is one form of a direct drive electric machine. The disclosed electric motors can alternatively be used in other industries and/or other direct drive electric machine applications that may or may not pertain to electric vehicles, and that may or may not include one or more wheel(s).

As discussed above, in-wheel electric motors typically include bearings (e.g., ball bearings) located between the rotor and the stator of the electric motor, with the bearings being configured to support and/or guide the rotation of the rotor relative to the stator. For in-wheel electric motors having an outer rotor configuration in which the rotor circumscribes the stator, the bearings have a relatively large diameter (e.g., compared to the diameter of a bearing included in an electric motor having an inner rotor configuration). Traditional deep groove ball bearings are typically standardized and come in fixed sizes and shapes, thereby limiting flexibility in design. This is specifically apparent when large diameters (e.g., greater than two hundred millimeters) are required without an increased load capacity. Furthermore, such large diameter bearings are often speed restricted, with the speed restriction being driven by heat management primarily in relation to the lubricating medium and sealing surfaces. Non-standard bearings of these dimensions are commonly either heavy and rated for much higher loads than required, or of a high cost.

Example in-wheel electric motors disclosed herein have an outer rotor configuration for which traditional large diameter bearings provide a less than ideal solution. The disclosed in-wheel electric motors include raceway bearing assemblies (e.g., raceway bearing arrangements) having ball bearings of a standard size located and/or retained between customized inner and outer raceways, with the inner raceway being mounted on the stator of the electric motor, and with the outer raceway being mounted on the rotor of the electric motor. In some disclosed examples, the inner raceway is formed by a first inner race wire and a second inner race wire that are respectively mounted on the stator, and the outer raceway is formed by a first outer race wire and a second outer race wire that are respectively mounted on the rotor.

The race wires of the disclosed raceway bearing assemblies provide significant design flexibility that advantageously enables non-standard bearing sizes to be easily manufactured at a low cost. Such raceway bearing assemblies advantageously have a lower mass compared to traditional bearing assemblies of a substantially similar size. The race wires of the disclosed raceway bearing assemblies also have a compact packaging volume, which advantageously enables larger balls to be incorporated into a raceway bearing assembly within a given package space. The incorporation of such larger balls advantageously allows the bearing to carry more load and to run at a higher speed.

In some disclosed examples, respective ones of the race wires of the disclosed raceway bearing assemblies can be positioned, angled, and/or otherwise arranged in different configurations (e.g., a square-shaped arrangement, a horizontally-extending rectangular-shaped arrangement, a vertically-extending rectangular-shaped arrangement, etc.) relative to the balls of the disclosed raceway bearing assemblies to advantageously anticipate the required axial and radial load sharing thereof. For example, the respective ones of the race wires can be arranged and/or positioned in a first configuration relative to the balls to distribute radial loads and axial loads evenly. As another example, the respective ones of the race wires can be arranged and/or positioned in a second configuration relative to the balls to distribute radial loads and axial loads in a manner that favors the axial loads. As yet another example, the respective ones of the race wires can be arranged and/or positioned in a third configuration relative to the balls to distribute radial loads and axial loads in a manner that favors the radial loads.

In some such disclosed examples, the first inner race wire is mounted on a heatsink of the stator, and the second inner race wire is mounted on a seal plate of the stator. Mounting a portion (e.g., the first inner race wire) of the inner raceway on the heatsink of the stator advantageously enables the inner raceway and/or, more generally, the raceway bearing assembly, to benefit from the cooling properties of the heatsink. In this regard, large diameter bearings are traditionally speed restrained, with the speed restriction being caused primarily by the bearing overheating and degrading the properties of the bearing lubricant, and also as a result of friction from contacting sealing surfaces. Mounting a portion of the inner raceway directly on the heatsink of the stator accordingly provides a significant advantage with regard to thermal control (e.g., improved cooling of the bearing assembly). The small diameter race wires of the disclosed raceway bearing assemblies further provide a reduced (e.g., minimized) contact area between the race wires and the balls of the raceway bearing assembly, which advantageously reduces friction between those components, thereby further enhancing the cooling properties of the disclosed raceway bearing assemblies. Forming the balls of the disclosed raceway bearing assemblies from a ceramic material also reduced friction between the race wires and the balls, thereby even further enhancing the cooling properties of the disclosed raceway bearing assemblies. Forming the balls of the disclosed raceway bearing assemblies from a ceramic material is also advantageous with regard to reducing the likelihood of capacitive spark discharges that may damage the raceways.

Mounting the first inner race wire on the heatsink of the stator and separately mounting the second inner race wire on the seal plate of the stator also provides unique assembly advantages, including reducing the complexity of the assembly process. In this regard, once the first outer race wire and the second outer race wire of the raceway bearing assembly have been mounted on the rotor, the balls of the raceway bearing assembly can then be positioned on the first outer race wire and the second outer race wire of the rotor, with the balls being retained as a ring using a standard cage. Next, the rotor and the balls can be assembled relative to the portion of the stator that includes the heatsink having the first inner race wire mounted thereto. Finally, the portion of the stator that includes the seal plate having the second inner race wire mounted thereto can be mounted on one or more other portion(s) (e.g., the heatsink portion) of the stator, thereby completing the assembly and fully constraining the raceway bearing assembly within the electric motor. Assembly benefits associated with the disclosed raceway bearing assemblies include size flexibility and low component count. The cross-sectional profile of the raceway can remain constant for all diameters, only differing in length to achieve the correct circumference. Thus, the tooling for the raceways and potentially the ball bearings themselves remain constant for all bearing sizes, thereby lowering part count across a broad range of products.

In some disclosed examples, an in-wheel electric motor includes a stator, a rotor, and a raceway bearing assembly. The rotor circumscribes the stator. The rotor is configured to rotate relative to the stator. The raceway bearing assembly is located between the rotor and the stator. In some disclosed examples, the raceway bearing assembly includes a first inner race wire, a second inner race wire, a first outer race wire, a second outer race wire, and a plurality of balls. The first inner race wire is mounted on the stator. The second inner race wire is mounted on the stator. The second inner race wire is spaced apart from the first inner race wire. The first outer race wire is mounted on the rotor. The first outer race wire is spaced apart from the first inner race wire and second inner race wire. The second outer race wire is mounted on the rotor. The second outer race wire is spaced apart from the first inner race wire, the second inner race wire, and the first outer race wire. Respective ones of the plurality of balls are located and/or retained between the first inner race wire, the second inner race wire, the first outer race wire, and the second outer race wire.

In some disclosed examples, the first inner race wire and the second inner race wire collectively form an inner raceway mounted on the stator. The first outer race wire and the second outer race wire collectively form an outer raceway mounted on the rotor. The respective ones of the plurality of balls are located and/or retained between the inner raceway and the outer raceway.

In some disclosed examples, the stator includes a heatsink and a seal plate. The seal plate is located axially outward from the heatsink. The first inner race wire is mounted on the heatsink and the second inner race wire is mounted on the seal plate. In some disclosed examples, the in-wheel electric motor further includes a bearing seal located between the rotor and the stator at a position that is axially outward from the raceway bearing assembly.

In some disclosed examples, the first inner race wire, the second inner race wire, the first outer race wire, and the second outer race wire are collectively arranged to distribute radial loads and axial loads evenly. In other disclosed examples, the first inner race wire, the second inner race wire, the first outer race wire, and the second outer race wire are collectively arranged to distribute radial loads and axial loads in a manner that favors the axial loads. In still other disclosed examples, the first inner race wire, the second inner race wire, the first outer race wire, and the second outer race wire are collectively arranged to distribute radial loads and axial loads in a manner that favors the radial loads.

In some disclosed examples, the raceway bearing assembly of the aforementioned in-wheel electric motor is alternatively configured to include an inner race strip (e.g., in lieu of the aforementioned first and second inner race wires) and an outer race strip (e.g., in lieu of the aforementioned first and second outer race wires). In such disclosed examples, the inner race strip is mounted on the stator and the outer race strip is mounted on the rotor, with the outer race strip being spaced apart from the inner race strip. Respective ones of the plurality of balls are located and/or retained between the inner race strip and the outer race strip. In some such disclosed examples, a first portion of the inner race strip is mounted on a heatsink of the stator, and a second portion of the inner race strip is mounted on a seal plate of the stator, with the seal plate being located axially outward from the heatsink. In some such disclosed examples, a bearing seal of the in-wheel electric motor is located between the rotor and the stator at a position that is axially outward from the raceway bearing assembly.

The above-identified features as well as other advantageous features of example raceway bearing assemblies for in-wheel outer rotor electric motors are further described below in connection with the figures of the application.

As used herein, the term "electric machine(s)" encompasses electric motor(s) configured to transform electrical energy into mechanical energy, and further encompasses electric generator(s) configured to transform mechanical energy into electrical energy.

As used herein, the term "bearing seal(s)" encompasses contact bearing seal(s) as well as non-contact bearing seal(s), and further encompasses bearing shield(s).

As used herein in a mechanical context, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, mounted, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts at the point (or points) of contact between the two parts.

As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein, the term "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

FIG. 1 is a side view of an example electric motor 100 having an outer rotor configuration. The electric motor 100 of FIG. 1 can be implemented in a manner that enables the electric motor 100 to function and/or operate either as an electric motor or as an electric generator. In the illustrated example of FIG. 1, the electric motor 100 includes an example stator 102 and an example rotor 104, with the stator 102 and the rotor 104 being arranged such that the rotor 104 circumscribes the stator 102. The rotor 104 of the electric motor 100 of FIG. 1 is configured to rotate relative to the stator 102. As shown in FIG. 1, the radial thickness of the stator 102 is substantially greater than the radial thickness of the rotor 104. The stator 102 and the rotor 104 are separated by an example air gap 106 having an example diameter 108 that generally corresponds to the inner diameter of the rotor 104. The presence of the air gap 106 facilitates rotation of the rotor 104 relative to the stator 102.

The diameter 108 of the air gap 106 of the electric motor 100 of FIG. 1 is substantially greater than a diameter of an air gap of a similarly-sized (e.g., identically sized) electric motor having an inner rotor configuration. The increased (e.g., maximized) diameter 108 of the air gap 106 associated with the outer rotor configuration of the electric motor 100 of FIG. 1 advantageously increases the volumetric torque density associated with the electric motor 100 relative to that of a similarly-sized electric motor having an inner rotor configuration. As a result, the outer rotor electric motor 100 of FIG. 1 is advantageously able to produce more torque in the package space (e.g., the overall volume of the motor) of the electric motor 100 in comparison to the torque which might be produced in the similarly-sized (e.g., identically-sized) package space (e.g., the overall volume of the motor) of an inner rotor electric motor. Outer rotor electric motors of the type shown in association with the electric motor 100 of FIG. 1 can accordingly be beneficial for applications requiring the generation of high levels of torque.

Figure 2:
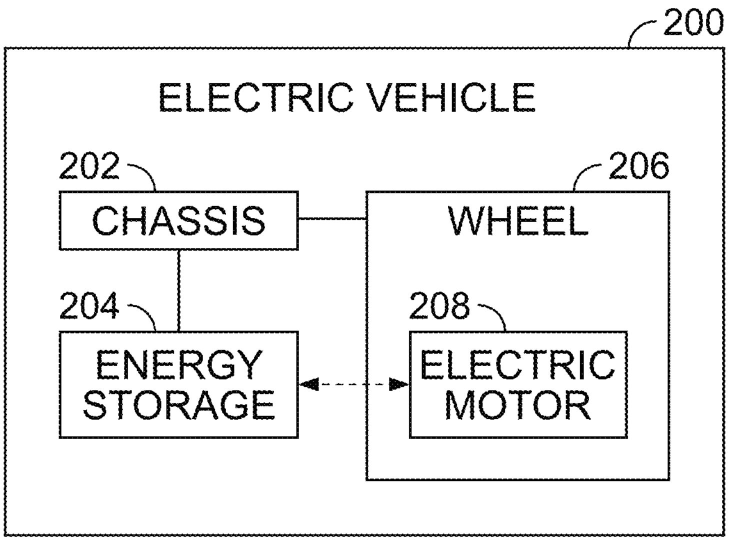
FIG. 2 is a block diagram of an example electric vehicle including an in-wheel electric motor.

FIG. 2 is a block diagram of an example electric vehicle 200 including an in-wheel electric motor. While the electric vehicle 200 of FIG. 2 is illustrated as having a single in-wheel electric motor associated with a single electrically-driven wheel, it is to be understood that the electric vehicle 200 can alternatively include a different number (e.g., two, three, four, etc.) of in-wheel electric motors associated with a different number (e.g., two, three, four, etc.) of electrically-driven wheels. It is also to be understood that the electric vehicle 200 of FIG. 2 can include one or more wheel(s) that is/are not electrically driven in addition to the one or more electrically-driven wheel(s) that is/are associated with the in-wheel electric motor(s) of the electric vehicle 200. For example, when the electric vehicle 200 of FIG. 2 is implemented as a two-wheeled electric motorcycle, the electric vehicle 200 may include a rear wheel that incorporates an in-wheel electric motor, and a front wheel that does not incorporate an in-wheel electric motor. As another example, when the electric vehicle 200 of FIG. 2 is implemented as a four-wheeled electric automobile, the electric vehicle 200 may include two rear wheels, with each of the rear wheels incorporating an in-wheel electric motor, and two front wheels, with neither of the front wheels incorporating an in-wheel electric motor. Aside from requiring at least one in-wheel electric motor (i.e., one electric motor incorporated into one wheel), the electric vehicle 200 of FIG. 2 is not otherwise limited to any particular combination and/or configuration with regard to the number(s), type(s), and/or arrangement(s) of the electric motor(s), the wheel(s), and/or any other component(s) that may form part of the electric vehicle 200.

In the illustrated example of FIG. 2, the electric vehicle 200 includes an example chassis 202, an example energy storage 204, an example wheel 206, and an example electric motor 208. The chassis 202 of FIG. 2 is a structural framework configured to support and/or carry one or more other structural component(s) of the electric vehicle 200. For example, the chassis 202 can be implemented as a frame configured to carry and/or support the energy storage 204 and/or the wheel 206 of the electric vehicle 200. The specific size, shape, and/or configuration of the chassis 202 will vary depending upon the intended application. For example, the chassis 202 may have a first configuration when the electric vehicle 200 of FIG. 2 is implemented as a two-wheeled electric motorcycle, and a second, different configuration when the electric vehicle 200 is implemented as a four-wheeled electric automobile. The energy storage 204 of FIG. 2 is mechanically coupled to (e.g., supported and/or carried by) the chassis 202 of the electric vehicle 200 and operatively coupled to (e.g., in electrical communication with) the electric motor 208 of the electric vehicle 200. The energy storage 204 is configured to transfer energy to the electric motor 208, and/or to receive energy from the electric motor 208. For example, when the electric motor 208 is implemented in a manner that enables the electric motor 208 to function and/or operate either as an electric motor or as an electric generator, the energy storage 204 can either transfer electrical energy to the electric motor 208, which thereafter converts the electrical energy into mechanical energy, or the electric motor 208 can convert mechanical energy into electrical energy, and thereafter transfer the electrical energy to the energy storage 204. The energy storage 204 of FIG. 2 can be implemented as either a DC power source with an inverter to convert DC power to AC power, or as an AC power source.

The wheel 206 of FIG. 2 is mechanically coupled to (e.g., supported and/or carried by) the chassis 202 of the electric vehicle 200. The specific size, shape, and/or configuration of the wheel 206 will vary depending upon the intended application. For example, the wheel 206 may have a first configuration when the electric vehicle 200 of FIG. 2 is implemented as a two-wheeled electric motorcycle, and a second, different configuration when the electric vehicle 200 is implemented as a four-wheeled electric automobile. In the illustrated example of FIG. 2, the wheel 206 incorporates and/or otherwise includes the electric motor 208 such that the electric motor 208 constitutes an in-wheel electric motor. The electric motor 208 of FIG. 2 is mechanically coupled to (e.g., supported and/or carried by) the chassis 202 of the electric vehicle 200. The specific size, shape, and/or configuration of the electric motor 208 will vary depending upon the intended application. For example, the electric motor 208 may have a first configuration when the electric vehicle 200 of FIG. 2 is implemented as a two-wheeled electric motorcycle, and a second, different configuration when the electric vehicle 200 is implemented as a four-wheeled electric automobile. In the illustrated example of FIG. 2, the electric motor 208 is preferably implemented by and/or as an electric motor having an outer rotor configuration (e.g., the electric motor 100 of FIG. 1 described above) in which a rotor of the electric motor 208 circumscribes a stator of the electric motor 208, with the rotor being configured to rotate relative to the stator. In such an implementation, the wheel 206 includes a tire that circumscribes and is mechanically coupled to the rotor of the electric motor 208 such that rotation of the rotor causes a corresponding rotation of the tire.

Figure 3:
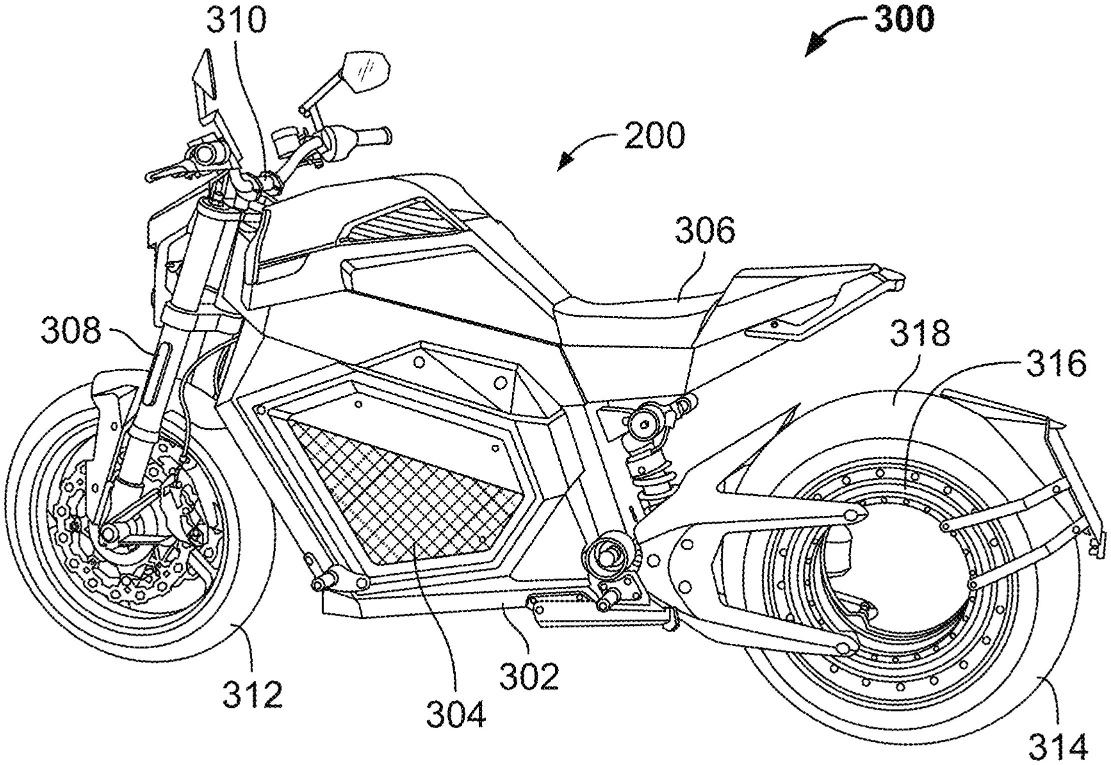
FIG. 3 is a perspective view of an example implementation of the electric vehicle of FIG. 2.

FIG. 3 is a perspective view of an example implementation of the electric vehicle 200 of FIG. 2. As shown in FIG. 3, the electric vehicle 200 is implemented as an electric motorcycle 300. An example chassis 302 of the electric motorcycle 300 (e.g., corresponding to the chassis 202 of FIG. 2) is configured to support and/or carry numerous structural component(s) of the electric motorcycle 300. For example, as shown in FIG. 3, the chassis 302 supports and/or carries an energy storage (e.g., a battery) that is concealed and/or otherwise located behind and/or within an example protective housing 304 associated with the chassis 302. The chassis 302 further supports and/or carries an example seat 306 of the electric motorcycle 300. The chassis 302 further supports and/or carries example forks 308 that support and/or carry example handlebars 310 and/or an example front wheel 312 of the electric motorcycle 300. The chassis 302 further supports and/or carries an example rear wheel 314 (e.g., corresponding to the wheel 206 of FIG. 2) that includes an example electric motor 316 (e.g., corresponding to the electric motor 208 of FIG. 2) of the electric motorcycle 300. The rear wheel 314 of the electric motorcycle 300 of FIG. 3 accordingly includes an in-wheel electric motor, while the front wheel 312 of the electric motorcycle 300 of FIG. 3 lacks any such in-wheel electric motor.

In the illustrated example of FIG. 3, the electric motor 316 is implemented in a manner that enables the electric motor 316 to function and/or operate either as an electric motor or as an electric generator. The electric motor 316 of the electric motorcycle 300 of FIG. 3 has an outer rotor configuration in which a rotor of the electric motor 316 circumscribes a stator of the electric motor 316, with the rotor being configured to rotate relative to the stator. The rear wheel 314 of the electric motorcycle 300 includes an example tire 318 that circumscribes and is mechanically coupled to the rotor of the electric motor 316 such that rotation of the rotor causes a corresponding rotation of the tire 318. The electric motorcycle 300 of FIG. 3 illustrates one of many possible example implementations of the electric vehicle 200 of FIG. 2. As discussed above, numerous other example implementations of the electric vehicle 200 of FIG. 2 are possible, are contemplated, and/or are within the scope of the inventions disclosed herein.

Figure 4:
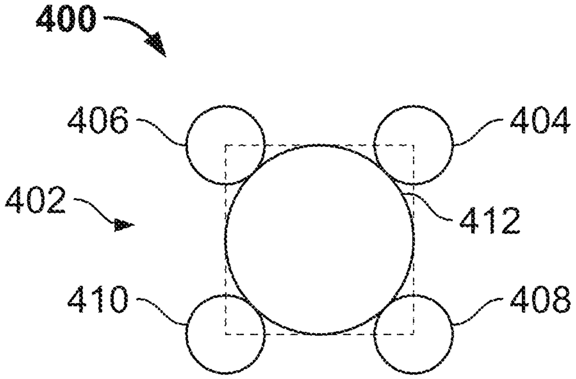
FIG. 4 is a cross-sectional view of an example raceway bearing assembly arranged in a first example configuration.

FIG. 4 is a cross-sectional view of an example raceway bearing assembly 400 arranged in a first example configuration 402. In the illustrated example of FIG. 4, the raceway bearing assembly 400 includes an example first inner race wire 404, an example second inner race wire 406, an example first outer race wire 408, an example second outer race wire 410, and an example ball 412. Each one of the race wires (e.g., the first inner race wire 404, the second inner race wire 406, the first outer race wire 408, and the second outer race wire 410) of the raceway bearing assembly 400 is preferably formed from a hard material such as steel. The race wires can alternatively be formed from a softer material (e.g., aluminum) that is coated with a hard material, or hardened by a hardening process such as hard anodizing. The ball 412 of the raceway bearing assembly 400 is one of a plurality of identically configured balls included within the raceway bearing assembly 400. Each one of the balls (e.g., including the illustrated ball 412) is preferably formed from a ceramic material. The balls can alternatively be formed from a hard material (e.g., steel), or from a softer material (e.g., aluminum) that is coated with a hard material, or hardened by a hardening process such as hard anodizing.

In the illustrated example of FIG. 4, the second inner race wire 406 is spaced apart from the first inner race wire 404. The first outer race wire 408 is spaced apart from the first inner race wire 404 and second inner race wire 406. The second outer race wire 410 is spaced apart from the first inner race wire 404, the second inner race wire 406, and the first outer race wire 408. The ball 412 is located (e.g., centrally located) and/or retained between the first inner race wire 404, the second inner race wire 406, the first outer race wire 408, and the second outer race wire 410. Respective ones of other balls included within the raceway bearing assembly 400 of FIG. 4 are likewise located (e.g., centrally located) and/or retained between the first inner race wire 404, the second inner race wire 406, the first outer race wire 408, and the second outer race wire 410.

The naming conventions for the "inner" and "outer" race wires of the raceway bearing assembly 400 of FIG. 4 are derived from the respective inner and outer locations of the structures on which the race wires are to be mounted. In this regard, the first inner race wire 404 and the second inner race wire 406 of FIG. 4 are respectively configured to be mounted on a stator of an electric motor, and the first outer race wire 408 and the second outer race wire 410 are respectively configured to be mounted on a rotor of the electric motor, with the electric motor having an outer rotor configuration in which the rotor circumscribes the stator, as further described herein. In some examples further described herein, the first inner race wire 404 and the second inner race wire 406 collectively form an inner raceway mounted on the stator, and the first outer race wire 408 and the second outer race wire 410 collectively form an outer raceway mounted on the rotor, with the ball 412 (e.g., along with the respective ones of the other balls included within the raceway bearing assembly 400) being located and/or retained between the inner raceway and the outer raceway. In some examples further described herein, the first inner race wire 404 is configured to be mounted on a heatsink of the stator of the electric motor, and the second inner race wire 406 is configured to be mounted on a seal plate of the stator of the electric motor, with the seal plate being located axially outward from the heatsink.

As shown in FIG. 4, the first configuration 402 of the raceway bearing assembly 400 is a configuration in which the first inner race wire 404, the second inner race wire 406, the first outer race wire 408, and the second outer race wire 410 are arranged about the ball 412 in a square-shaped pattern and/or arrangement. When the first inner race wire 404, the second inner race wire 406, the first outer race wire 408, and the second outer race wire 410 are respectively arranged about the ball 412 in the first configuration 402 shown in FIG. 4, the first inner race wire 404, the second inner race wire 406, the first outer race wire 408, and the second outer race wire 410 distribute radial loads and axial loads evenly (e.g., in a manner that provides even support for the radial loads and the axial loads). As shown in FIG. 4, the raceway bearing assembly 400 includes a total of four race wires (e.g., the first inner race wire 404, the second inner race wire 406, the first outer race wire 408, and the second outer race wire 410). In other examples, the bearing assembly 400 can instead include a total of three race wires arranged about the ball in a triangular-shaped pattern and/or arrangement. In still other examples, the bearing assembly 400 can instead include a total of five or more race wires arranged about the ball in various geometric-shaped (e.g., pentagonal, hexagonal, heptagonal, octagonal, etc.) patterns and/or arrangements.

Figure 5:
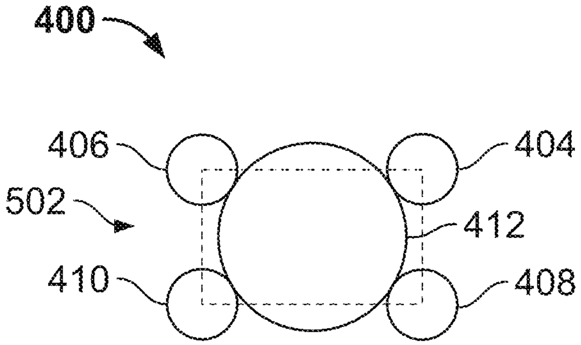
FIG. 5 is a cross-sectional view of the raceway bearing assembly of FIG. 4 arranged in a second example configuration.

FIG. 5 is a cross-sectional view of the raceway bearing assembly 400 of FIG. 4 arranged in a second example configuration 502. As shown in FIG. 5, the second configuration 502 of the raceway bearing assembly 400 is a configuration in which the first inner race wire 404, the second inner race wire 406, the first outer race wire 408, and the second outer race wire 410 are arranged about the ball 412 in horizontally-extending rectangular-shaped pattern and/or arrangement. When the first inner race wire 404, the second inner race wire 406, the first outer race wire 408, and the second outer race wire 410 are respectively arranged about the ball 412 in the second configuration 502 shown in FIG. 5, the first inner race wire 404, the second inner race wire 406, the first outer race wire 408, and the second outer race wire 410 distribute radial loads and axial loads in a manner that favors the axial loads (e.g., in a manner that better supports the axial loads relative to support provided for the radial loads).

Figure 6:
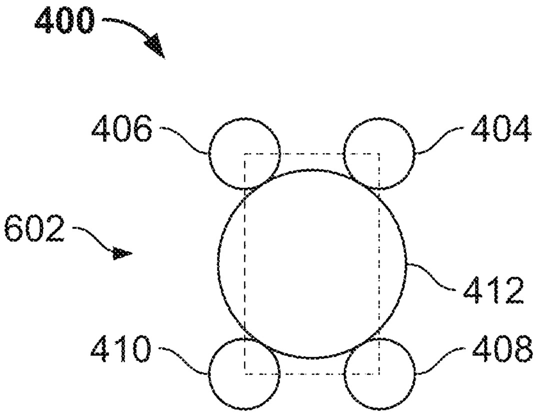
FIG. 6 is a cross-sectional view of the raceway bearing assembly of FIGS. 4 and 5 arranged in a third example configuration.

FIG. 6 is a cross-sectional view of the raceway bearing assembly 400 of FIGS. 4 and 5 arranged in a third example configuration 602. As shown in FIG. 6, the third configuration 602 of the raceway bearing assembly 400 is a configuration in which the first inner race wire 404, the second inner race wire 406, the first outer race wire 408, and the second outer race wire 410 are arranged about the ball 412 in vertically-extending rectangular-shaped pattern and/or arrangement. When the first inner race wire 404, the second inner race wire 406, the first outer race wire 408, and the second outer race wire 410 are respectively arranged about the ball 412 in the third configuration 602 shown in FIG. 6, the first inner race wire 404, the second inner race wire 406, the first outer race wire 408, and the second outer race wire 410 distribute radial loads and axial loads in a manner that favors the radial loads. (e.g., in a manner that better supports the radial loads relative to support provided for the axial loads).

Figure 7:
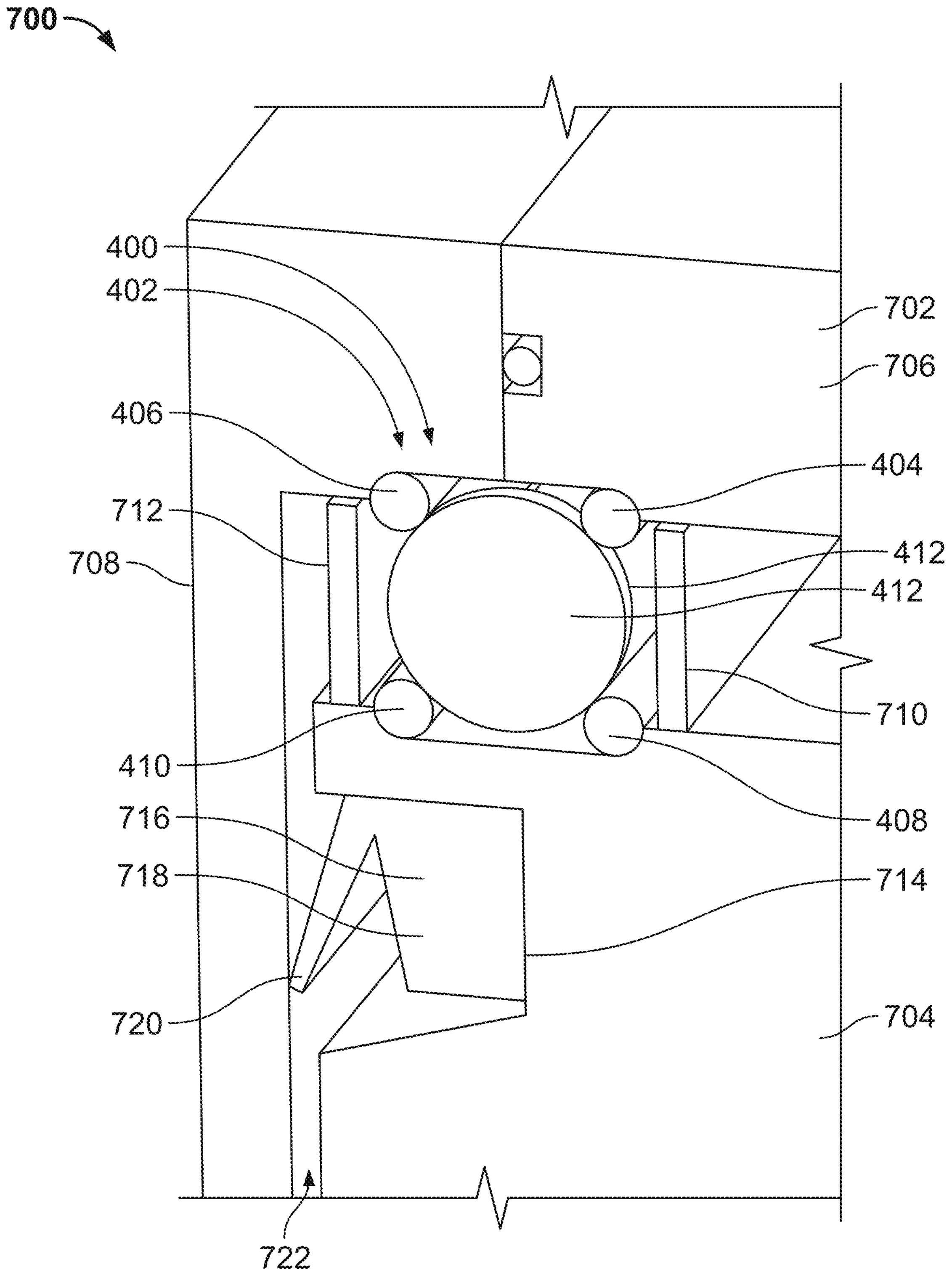
FIG. 7 is a perspective sectional view of an example electric motor including the raceway bearing assembly of FIGS. 4-6, with the raceway bearing assembly arranged in the first configuration of FIG. 4.

FIG. 7 is a perspective sectional view of an example electric motor 700 including the raceway bearing assembly 400 of FIGS. 4-6, with the raceway bearing assembly 400 arranged in the first configuration 402 of FIG. 4. In other examples, the electric motor 700 of FIG. 7 can instead include the raceway bearing assembly 400 of FIGS. 4-6, with the raceway bearing assembly 400 arranged in the second configuration 502 of FIG. 5. In still other examples, the electric motor 700 of FIG. 7 can instead include the raceway bearing assembly 400 of FIGS. 4-6, with the raceway bearing assembly 400 arranged in the third configuration 602 of FIG. 6.

In the illustrated example of FIG. 7, the electric motor 700 includes an example stator 702 and an example rotor 704. The electric motor 700 of FIG. 7 has an outer rotor configuration in which the rotor 704 of the electric motor 700 circumscribes the stator 702 of the electric motor 700, with the rotor 704 being configured to rotate relative to the stator 702. The stator 702 of the electric motor 700 of FIG. 7 includes an example heatsink 706 and an example seal plate 708, with the seal plate 708 being located axially outward from the heatsink 706. In some examples, the seal plate 708 is removably coupled (e.g., via one or more fastener(s)) to the heatsink 706. The removable nature of the seal plate 708 advantageously enables replacement of the seal plate 708 when the seal plate 708 becomes worn. The seal plate 708 is preferably formed from a hard material such as steel. The seal plate 708 can alternatively be formed from a softer material (e.g., aluminum) that is coated with a hard material, or hardened via a hardening process such as hard anodizing.

The raceway bearing assembly 400 (e.g., including the first inner race wire 404, the second inner race wire 406, the first outer race wire 408, the second outer race wire 410, and the balls 412) of the electric motor 700 of FIG. 7 is located between the rotor 704 and the stator 702 of the electric motor 700. The raceway bearing assembly 400 is configured to guide and/or support the rotation of the rotor 704 of the electric motor 700 relative to the stator 702 of the electric motor 700. As shown in FIG. 7, the second inner race wire 406 is spaced apart from the first inner race wire 404. The first outer race wire 408 is spaced apart from the first inner race wire 404 and second inner race wire 406. The second outer race wire 410 is spaced apart from the first inner race wire 404, the second inner race wire 406, and the first outer race wire 408. Respective ones of the balls 412 are located (e.g., centrally located) and/or retained between the first inner race wire 404, the second inner race wire 406, the first outer race wire 408, and the second outer race wire 410.

In the illustrated example of FIG. 7, the first inner race wire 404 and the second inner race wire 406 are respectively mounted on (e.g., coupled to via a friction fit, via an adhesive, via one or more weld(s), via one or more fastener(s), etc.) the stator 702 of the electric motor 700. More specifically, the first inner race wire 404 is mounted on the heatsink 706 of the stator 702 of the electric motor 700, and the second inner race wire 406 is mounted on the seal plate 708 of the stator 702 of the electric motor 700. The first inner race wire 404 and the second inner race wire 406 are static and/or stationary. As further shown in FIG. 7, the first outer race wire 408 and the second outer race wire 410 are respectively mounted on (e.g., coupled to via a friction fit, via an adhesive, via one or more weld(s), via one or more fastener(s), etc.) the rotor 704 of the electric motor 700. The first outer race wire 408 and the second outer race wire 410 are configured to rotate along with (e.g., in unison with) the rotor 704 of the electric motor 700 as the rotor 704 rotates relative to the stator 702. The first inner race wire 404 and the second inner race wire 406 collectively form an inner raceway mounted on the stator 702 of the electric motor 700. Conversely, the first outer race wire 408 and the second outer race wire 410 form an outer raceway mounted on the rotor 704 of the electric motor 700. As shown in FIG. 7, respective ones of the balls 412 are located and/or retained between the inner raceway and the outer raceway.

In the illustrated example of FIG. 7, the raceway bearing assembly 400 (e.g., including the first inner race wire 404, the second inner race wire 406, the first outer race wire 408, the second outer race wire 410, and the balls 412) of the electric motor 700 is arranged in the first configuration 402 of FIG. 4 described above. The first inner race wire 404, the second inner race wire 406, the first outer race wire 408, and the second outer race wire 410 are accordingly arranged about the balls 412 in a square-shaped pattern and/or arrangement. When the first inner race wire 404, the second inner race wire 406, the first outer race wire 408, and the second outer race wire 410 are respectively arranged about the balls 412 in the first configuration 402 shown in FIG. 7, the first inner race wire 404, the second inner race wire 406, the first outer race wire 408, and the second outer race wire 410 distribute radial loads and axial loads evenly (e.g., in a manner that provides even support for the radial loads and the axial loads).

The electric motor 700 of FIG. 7 further includes a first example bearing seal 710 and a second example bearing seal 712 that are respectively associated with the raceway bearing assembly 400 of the electric motor 700. In the illustrated example of FIG. 7, the first bearing seal 710 is located between the stator 702 and the rotor 704 of the electric motor 700 at a position that is axially inward from the first inner race wire 404 and the first outer race wire 408 and/or, more generally, axially inward from the raceway bearing assembly 400 of the electric motor 700. The second bearing seal 712 is located between the stator 702 and the rotor 704 of the electric motor 700 at a position that is axially outward from the second inner race wire 406 and the second outer race wire 410 and/or, more generally, axially outward from the raceway bearing assembly 400 of the electric motor 700. As further shown in FIG. 7, the second bearing seal 712 is located axially inward from the seal plate 708 of the stator 702. The first bearing seal 710 and the second bearing seal 712 are respectively configured to retain grease and/or oil within the raceway bearing assembly 400 of the electric motor 700.

The electric motor 700 of FIG. 7 further includes an example channel 714 formed in the rotor 704 along a side portion of the rotor 704. The channel 714 is located axially inward from the seal plate 708 of the stator 702 of the electric motor 700. The channel 714 is also located radially outward from the raceway bearing assembly 400, the first bearing seal 710, and/or the second bearing seal 712 of the electric motor 700. The electric motor 700 of FIG. 7 further includes an example lip seal 716 located between the rotor 704 and the stator 702 at a position that is radially outward from the raceway bearing assembly 400, the first bearing seal 710, and/or the second bearing seal 712 of the electric motor 700. The lip seal 716 of FIG. 7 is located at least partially within the channel 714 of the rotor 704. In the illustrated example of FIG. 7, the lip seal 716 includes an example base 718 and an example flexible lip 720. The flexible lip 720 extends from and is movable relative to the base 718. In the illustrated example of FIG. 7, the base 718 of the lip seal 716 is coupled and/or otherwise attached (e.g., via a friction fit, via an adhesive, via one or more fastener(s), etc.) to the rotor 704 of the electric motor 700, with the base 718 of the lip seal 716 being located at least partially within the channel 714 of the rotor 704. The flexible lip 720 of the lip seal 716 extends from the base 718 of the lip seal 716 in a radially and axially outward direction relative to the point and/or the area at which the flexible lip 720 of the lip seal 716 connects and/or otherwise attaches to the base 718 of the lip seal 716.

Movement of the flexible lip 720 of the lip seal 716 relative to the base 718 of the lip seal 716 occurs in response to rotation of the rotor 704 of the electric motor 700 relative to the stator 702 of the electric motor 700 at a rotational speed that is greater than or equal to a threshold rotational speed. For example, the lip seal 716 of the electric motor 700 of FIG. 7 can be designed and/or configured such that the flexible lip 720 of the lip seal 716 begins to move axially inward toward the base 718 of the lip seal 716 (e.g., away from the seal plate 708) when the rotor 704 of the electric motor 700 reaches or exceeds a threshold rotational speed of approximately one hundred revolutions per minute (100 rpm). When the rotational speed of the rotor 704 reaches or exceeds the threshold rotational speed, the centrifugal rotational force acting on the flexible lip 720 of the lip seal 716 exceeds the force of gravity acting on the flexible lip 720 of the lip seal 716, thereby causing movement of the flexible lip 720 of the lip seal 716 relative to the base 718 of the lip seal 716.

The flexible lip 720 of the lip seal 716 of FIG. 7 is configured to engage (e.g., contact) the seal plate 708 of the stator 702 when the rotor 704 of the electric motor 700 of FIG. 7 is rotating at a rotational speed that is less than the threshold rotational speed. The flexible lip 720 of the lip seal 716 of FIG. 7 is further configured to be spaced apart from (e.g., so as not to contact) the seal plate 708 of the stator 702 when the rotor 704 of the electric motor 700 of FIG. 7 is rotating relative to the stator 702 at a rotational speed that is greater than or equal to the threshold rotational speed. In such examples, the flexible lip 720 of the lip seal 716 of FIG. 7 becomes spaced apart from the seal plate 708 of the stator 702 in response to a centrifugal rotational force transferred to the flexible lip 720 of the lip seal 716 when the rotor 704 is rotating relative to the stator 702 at a rotational speed that is greater than or equal to the threshold rotational speed. In this regard, the flexible lip 720 of the lip seal 716 of FIG. 7 is configured to move in an axially inward direction away from the seal plate 708 of the stator 702 in response to the centrifugal rotational force that is generated by the rotation of the rotor 704 when the rotational speed of the rotor 704 is greater than or equal to the threshold rotational speed.

In the illustrated example of FIG. 7, an example gap 722 (e.g., an air gap) existing between the stator 702 and the rotor 704 along the side of the electric motor 700 extends from a location that is external to the electric motor 700 to a location that is internal to the electric motor 700, with the gap 722 extending to the second bearing seal 712 and/or the raceway bearing assembly 400 of the electric motor 700. The gap 722 accordingly passes between the lip seal 716 and the seal plate 708. The flexible lip 720 of the lip seal 716 of FIG. 7 is configured to narrow or close the gap 722 at a location radially outward from the second bearing seal 712 and/or the raceway bearing assembly 400 when the rotor 704 of the electric motor 700 of FIG. 7 is rotating relative to the stator 702 at a rotational speed that is less than the threshold rotational speed. The flexible lip 720 of the lip seal 716 of FIG. 7 is further configured to widen or open the gap 722 at a location radially outward from the second bearing seal 712 and/or the raceway bearing assembly 400 when the rotor 704 of the electric motor 700 of FIG. 7 is rotating relative to the stator 702 at a rotational speed that is greater than or equal to the threshold rotational speed.

Figure 8:
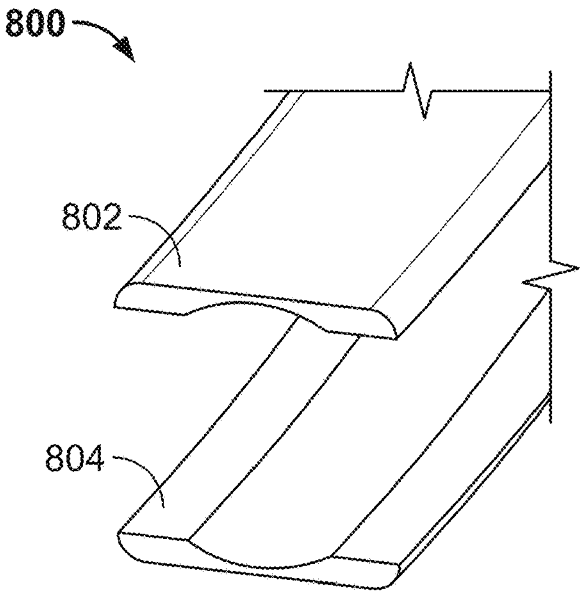
FIG. 8 is a perspective sectional view of example race strips for an alternate raceway bearing assembly.

FIG. 8 is a perspective sectional view of example race strips 800 for an alternate raceway bearing assembly. In the illustrated example of FIG. 8, the race strips 800 include an example inner race strip 802 and an example outer race strip 804, with the outer race strip 804 being spaced apart from the inner race strip 802. The inner race strip 802 and the outer race strip 804 of FIG. 8 are respectively formed as flat strips that include a contoured portion configured to receive (e.g., to cradle) a portion of a ball, such as a portion of the ball 412 of the raceway bearing assembly 400 of FIG. 4 described above. The inner race strip 802 and the outer race strip 804 are preferably formed from a hard material such as steel. The inner race strip 802 and the outer race strip can alternatively be formed from a softer material (e.g., aluminum) that is coated with a hard material, or hardened by a hardening process such as hard anodizing.

The naming conventions for the "inner" and "outer" race strips 800 of FIG. 8 are derived from the respective inner and outer locations of the structures on which the race strips are to be mounted. In this regard, the inner race strip 802 is configured to be mounted on a stator of an electric motor, and the outer race strip 804 is configured to be mounted on a rotor of the electric motor, with the electric motor having an outer rotor configuration in which the rotor circumscribes the stator, as further described herein. In some examples further described herein, a first portion of the inner race strip 802 is configured to be mounted on a heatsink of the stator of the electric motor, and a second portion of the inner race strip 802 is configured to be mounted on a seal plate of the stator of the electric motor, with the seal plate being located axially outward from the heatsink.

Figure 9:
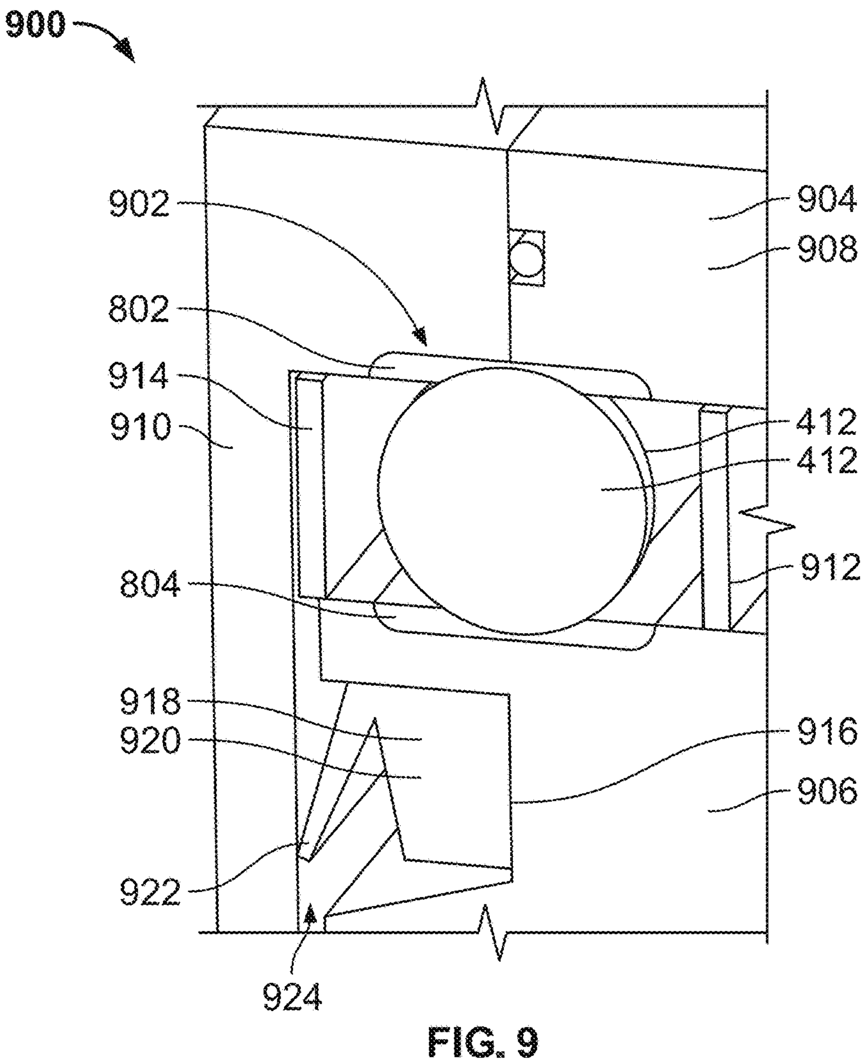
FIG. 9 is a perspective sectional view of an example electric motor including an example raceway bearing assembly that incorporates the race strips of FIG. 8.

FIG. 9 is a perspective sectional view of an example electric motor 900 including an example raceway bearing assembly 902 that incorporates the race strips 800 of FIG. 8. In the illustrated example of FIG. 9, the electric motor 900 includes an example stator 904 and an example rotor 906. The electric motor 900 of FIG. 9 has an outer rotor configuration in which the rotor 906 of the electric motor 900 circumscribes the stator 904 of the electric motor 900, with the rotor 906 being configured to rotate relative to the stator 904. The stator 904 of the electric motor 900 of FIG. 9 includes an example heatsink 908 and an example seal plate 910, with the seal plate 910 being located axially outward from the heatsink 908. In some examples, the seal plate 910 is removably coupled (e.g., via one or more fastener(s)) to the heatsink 908. The removable nature of the seal plate 910 advantageously enables replacement of the seal plate 910 when the seal plate 910 becomes worn. The seal plate 910 is preferably formed from a hard material such as steel. The seal plate 910 can alternatively be formed from a softer material (e.g., aluminum) that is coated with a hard material, or hardened via a hardening process such as hard anodizing.

The raceway bearing assembly 902 of the electric motor 900 of FIG. 9 includes the inner race strip 802, the outer race strip 804, and a plurality of balls (e.g., corresponding to the balls 412 of the raceway bearing assembly 400 of FIGS. 4-7 described above). As shown in FIG. 9, the raceway bearing assembly 902 of the electric motor 900 is located between the rotor 906 and the stator 904 of the electric motor 900. The raceway bearing assembly 902 is configured to guide and/or support the rotation of the rotor 906 of the electric motor 900 relative to the stator 904 of the electric motor 900. As shown in FIG. 9, outer race strip 804 is spaced apart from the inner race strip 802. Respective ones of the balls 412 are located (e.g., centrally located) and/or retained between the inner race strip 802 and the outer race strip 804.

In the illustrated example of FIG. 9, the inner race strip 802 is mounted on (e.g., coupled to via a friction fit, via an adhesive, via one or more weld(s), via one or more fastener(s), etc.) the stator 904 of the electric motor 900. More specifically, a first portion of the inner race strip 802 is mounted on the heatsink 908 of the stator 904 of the electric motor 900, and a second portion of the inner race strip 802 is mounted on the seal plate 910 of the stator 904 of the electric motor 900. The inner race strip 802 is static and/or stationary. As further shown in FIG. 9, the outer race strip 804 is mounted on (e.g., coupled to via a friction fit, via an adhesive, via one or more weld(s), via one or more fastener(s), etc.) the rotor 906 of the electric motor 900. The outer race strip 804 is configured to rotate along with (e.g., in unison with) the rotor 906 of the electric motor 900 as the rotor 906 rotates relative to the stator 904.

The electric motor 900 of FIG. 9 further includes a first example bearing seal 912 and a second example bearing seal 914 that are respectively associated with the raceway bearing assembly 902 of the electric motor 900. In the illustrated example of FIG. 9, the first bearing seal 912 is located between the stator 904 and the rotor 906 of the electric motor 900 at a position that is axially inward from the inner race strip 802 and the outer race strip 804 and/or, more generally, axially inward from the raceway bearing assembly 902 of the electric motor 900. The second bearing seal 914 is located between the stator 904 and the rotor 906 of the electric motor 900 at a position that is axially outward from the inner race strip 802 and the outer race strip 804 and/or, more generally, axially outward from the raceway bearing assembly 902 of the electric motor 900. As further shown in FIG. 9, the second bearing seal 914 is located axially inward from the seal plate 910 of the stator 904. The first bearing seal 912 and the second bearing seal 914 are respectively configured to retain grease and/or oil within the raceway bearing assembly 902 of the electric motor 900.

The electric motor 900 of FIG. 9 further includes an example channel 916 formed in the rotor 906 along a side portion of the rotor 906. The channel 916 is located axially inward from the seal plate 910 of the stator 904 of the electric motor 900. The channel 916 is also located radially outward from the raceway bearing assembly 902, the first bearing seal 912, and/or the second bearing seal 914 of the electric motor 900. The electric motor 900 of FIG. 9 further includes an example lip seal 918 located between the rotor 906 and the stator 904 at a position that is radially outward from the raceway bearing assembly 902, the first bearing seal 912, and/or the second bearing seal 914 of the electric motor 900. The lip seal 918 of FIG. 9 is located at least partially within the channel 916 of the rotor 906. In the illustrated example of FIG. 9, the lip seal 918 includes an example base 920 and an example flexible lip 922. The flexible lip 922 extends from and is movable relative to the base 920. In the illustrated example of FIG. 9, the base 920 of the lip seal 918 is coupled and/or otherwise attached (e.g., via a friction fit, via an adhesive, via one or more fastener(s), etc.) to the rotor 906 of the electric motor 900, with the base 920 of the lip seal 918 being located at least partially within the channel 916 of the rotor 906. The flexible lip 922 of the lip seal 918 extends from the base 920 of the lip seal 918 in a radially and axially outward direction relative to the point and/or the area at which the flexible lip 922 of the lip seal 918 connects and/or otherwise attaches to the base 920 of the lip seal 918.

Movement of the flexible lip 922 of the lip seal 918 relative to the base 920 of the lip seal 918 occurs in response to rotation of the rotor 906 of the electric motor 900 relative to the stator 904 of the electric motor 900 at a rotational speed that is greater than or equal to a threshold rotational speed. For example, the lip seal 918 of the electric motor 900 of FIG. 9 can be designed and/or configured such that the flexible lip 922 of the lip seal 918 begins to move axially inward toward the base 920 of the lip seal 918 (e.g., away from the seal plate 910) when the rotor 906 of the electric motor 900 reaches or exceeds a threshold rotational speed of approximately one hundred revolutions per minute (100 rpm). When the rotational speed of the rotor 906 reaches or exceeds the threshold rotational speed, the centrifugal rotational force acting on the flexible lip 922 of the lip seal 918 exceeds the force of gravity acting on the flexible lip 922 of the lip seal 918, thereby causing movement of the flexible lip 922 of the lip seal 918 relative to the base 920 of the lip seal 918.

The flexible lip 922 of the lip seal 918 of FIG. 9 is configured to engage (e.g., contact) the seal plate 910 of the stator 904 when the rotor 906 of the electric motor 900 of FIG. 9 is rotating at a rotational speed that is less than the threshold rotational speed. The flexible lip 922 of the lip seal 918 of FIG. 9 is further configured to be spaced apart from (e.g., so as not to contact) the seal plate 910 of the stator 904 when the rotor 906 of the electric motor 900 of FIG. 9 is rotating relative to the stator 904 at a rotational speed that is greater than or equal to the threshold rotational speed. In such examples, the flexible lip 922 of the lip seal 918 of FIG. 9 becomes spaced apart from the seal plate 910 of the stator 904 in response to a centrifugal rotational force transferred to the flexible lip 922 of the lip seal 918 when the rotor 906 is rotating relative to the stator 904 at a rotational speed that is greater than or equal to the threshold rotational speed. In this regard, the flexible lip 922 of the lip seal 918 of FIG. 9 is configured to move in an axially inward direction away from the seal plate 910 of the stator 904 in response to the centrifugal rotational force that is generated by the rotation of the rotor 906 when the rotational speed of the rotor 906 is greater than or equal to the threshold rotational speed.

In the illustrated example of FIG. 9, an example gap 924 (e.g., an air gap) existing between the stator 904 and the rotor 906 along the side of the electric motor 900 extends from a location that is external to the electric motor 900 to a location that is internal to the electric motor 900, with the gap 924 extending to the second bearing seal 914 and/or the raceway bearing assembly 902 of the electric motor 900. The gap 924 accordingly passes between the lip seal 918 and the seal plate 910. The flexible lip 922 of the lip seal 918 of FIG. 9 is configured to narrow or close the gap 924 at a location radially outward from the second bearing seal 914 and/or the raceway bearing assembly 902 when the rotor 906 of the electric motor 900 of FIG. 9 is rotating relative to the stator 904 at a rotational speed that is less than the threshold rotational speed. The flexible lip 922 of the lip seal 918 of FIG. 9 is further configured to widen or open the gap 924 at a location radially outward from the second bearing seal 914 and/or the raceway bearing assembly 902 when the rotor 906 of the electric motor 900 of FIG. 9 is rotating relative to the stator 904 at a rotational speed that is greater than or equal to the threshold rotational speed.

Figure 10:
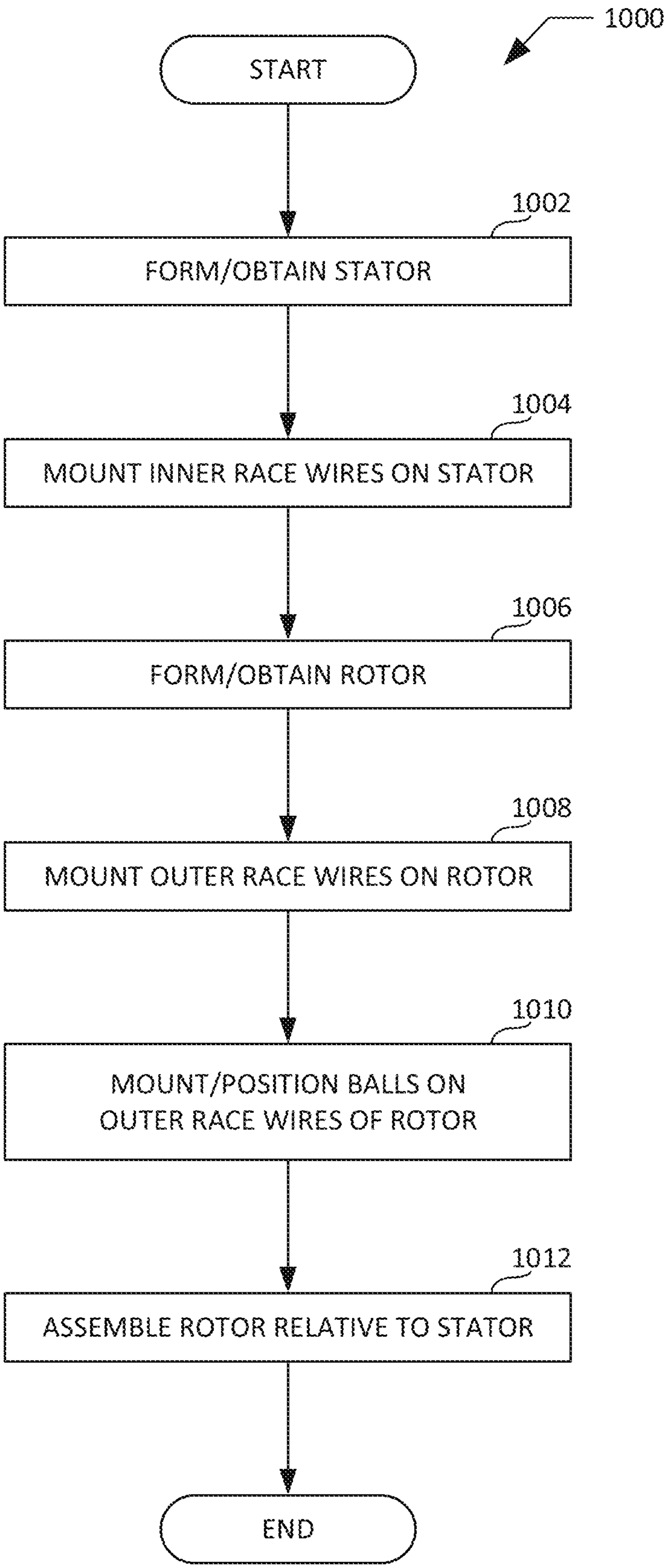
FIG. 10 is a flowchart representing a first example method for assembling an electric motor.
Figure 11:
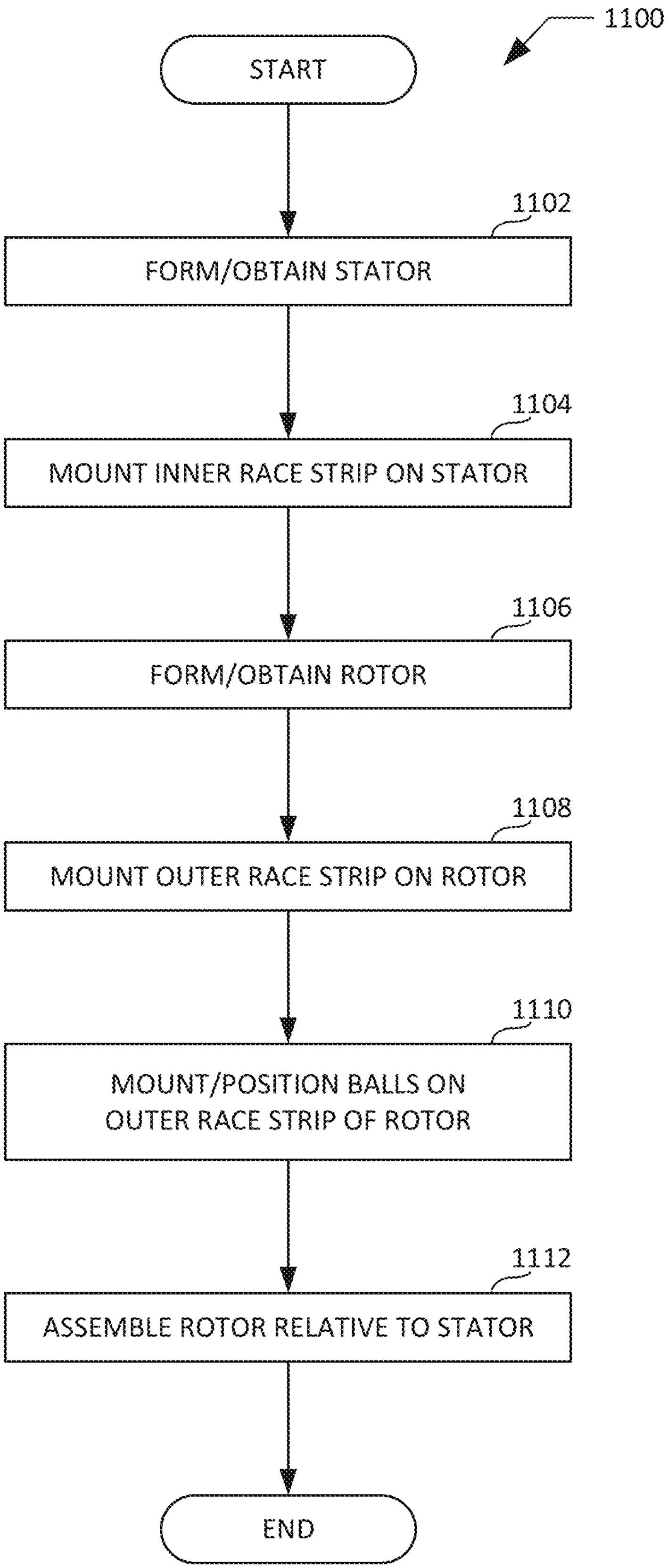
FIG. 11 is a flowchart representing a second example method for assembling an electric motor.

FIGS. 10 and 11 provide flowcharts corresponding to methods and/or processes associated with assembling the electric motors disclosed herein. The numbered blocks of the illustrated flowcharts represent operations and/or steps that are performed in the course of performing the described methods and/or processes. While the numbered blocks of the illustrated flowcharts are shown and described in a particular sequence and/or order, in other examples the numbered blocks of the flowcharts can instead be arranged in a different sequence and/or order. In still other examples, one or more of the numbered blocks illustrated in the flowcharts of FIGS. 10 and 11 can instead be omitted or modified, or one or more numbered blocks not presently shown in the flowcharts of FIGS. 10 and 11 can be added.

FIG. 10 is a flowchart representing a first example method 1000 for assembling an electric motor (e.g., the electric motor 700 of FIG. 7). In some examples, all of the numbered blocks shown in the flowchart of FIG. 10 are performed manually (e.g., by one or more humans). In other examples, one or more of the numbered blocks shown in the flowchart of FIG. 10 can instead be performed by and/or with assistance from a machine (e.g., a robotic assisted operation). In still other examples, all of the numbered blocks shown in the flowchart of FIG. 10 can instead be performed in a fully-automated manner (e.g., via a computer-controlled assembly line) without human interaction and/or guidance.

The method 1000 of FIG. 10 begins at Block 1002. At Block 1002, a stator is formed and/or obtained. For example, Block 1002 can be performed by forming and/or obtaining the stator 702 of FIG. 7 described above. In some examples, various components (e.g., a ferromagnetic core, a plurality of teeth, a plurality of windings, etc.) of the stator can be pre-formed, pre-positioned, and/or pre-assembled in connection with Block 1002. Following Block 1002, the method 1000 of FIG. 10 proceeds to Block 1004.

At Block 1004, inner races wires are mounted on the stator. For example, Block 1004 can be performed by mounting (e.g., coupling via a friction fit, via an adhesive, via one or more weld(s), via one or more fastener(s), etc.) the first inner race wire 404 and the second inner race wire 406 of the raceway bearing assembly 400 on the stator 702 of FIG. 7. In some examples, Block 1004 can be performed by mounting the first inner race wire 404 on the heatsink 706 of the stator 702 and mounting the second inner race wire 406 on the seal plate 708 of the stator 702. Following Block 1004, the method 1000 of FIG. 10 proceeds to Block 1006.

At Block 1006, a rotor is formed and/or obtained. For example, Block 1006 can be performed by forming and/or obtaining the rotor 704 of FIG. 7. In some examples, various components (e.g., an inner or outer ferromagnetic ring, an array of permanent magnets, etc.) of the rotor can be pre-formed, pre-positioned, and/or pre-assembled in connection with Block 1006. Following Block 1006, the method 1000 of FIG. 10 proceeds to Block 1008.

At Block 1008, outer races wires are mounted on the rotor. For example, Block 1008 can be performed by mounting (e.g., coupling via a friction fit, via an adhesive, via one or more weld(s), via one or more fastener(s), etc.) the first outer race wire 408 and the second outer race wire 410 of the raceway bearing assembly 400 on the rotor 704 of FIG. 7. Following Block 1008, the method 1000 of FIG. 10 proceeds to Block 1010.

At Block 1010, balls are mounted and/or positioned on the outer race wires of the rotor. For example, Block 1010 can be performed by mounting and/or positioning the balls 412 of the raceway bearing assembly 400 on the first outer race wire 408 and the second outer race wire 410 of the rotor 704 of FIG. 7. In some examples, positioning the balls on the outer race wires of the rotor in connection with Block 1010 includes retaining the balls as a ring using a standard cage. In other examples, the balls can be mounted and/or positioned on the inner race wires of the stator instead of being mounted and/or positioned on the outer race wires of the rotor. In still other examples, a first subset of the balls can be mounted and/or positioned on the inner race wires of the stator, and a second subset of the balls can be mounted and/or positioned on the outer race wires of the rotor. Following Block 1010, the method 1000 of FIG. 10 proceeds to Block 1012.

At Block 1012, the rotor is assembled relative to the stator. For example, Block 1012 can be performed by positioning the rotor 704 (e.g., including the first outer race wire 408, the second outer race wire 410, and the balls 412) externally relative to the stator 702 (e.g., including the first inner race wire 404 and the second inner race wire 406) such that the rotor 704 circumscribes the stator 702, as shown for example in FIG. 7. In connection with performing Block 1012, respective ones of the balls 412 of the raceway bearing assembly 400 become located (e.g., centrally located) and/or retained between the first inner race wire 404, the second inner race wire 406, the first outer race wire 408, and the second outer race wire 410 of the raceway bearing assembly 400. In some examples, performing Block 1012 includes a two-part process in which: (1) the heatsink 706 of the stator 702 having the first inner race wire 404 mounted thereon is first assembled relative to rotor 704 having the first outer race wire 408, the second outer race wire 410, and the balls 412 mounted and/or positioned thereon; and (2) the seal plate 708 of the stator 702 having the second inner race wire 406 mounted thereon is then assembled relative to heatsink 706 of the stator 702, thereby completing the formation of the raceway bearing assembly 400 and fully constraining the raceway bearing assembly 400 within the electric motor 700. Various other components (e.g., the first bearing seal 710, the second bearing seal 712, the lip seal 716, etc.) of the electric motor (e.g., the electric motor 700 of FIG. 7) can be mounted on, attached to, and/or assembled in relation to the stator and/or the rotor in connection with Block 1012. Following Block 1012, the method 1000 of FIG. 10 ends.

FIG. 11 is a flowchart representing a second example method 1100 for assembling an electric motor (e.g., the electric motor 900 of FIG. 9). In some examples, all of the numbered blocks shown in the flowchart of FIG. 11 are performed manually (e.g., by one or more humans). In other examples, one or more of the numbered blocks shown in the flowchart of FIG. 11 can instead be performed by and/or with assistance from a machine (e.g., a robotic assisted operation). In still other examples, all of the numbered blocks shown in the flowchart of FIG. 11 can instead be performed in a fully-automated manner (e.g., via a computer-controlled assembly line) without human interaction and/or guidance.

The method 1100 of FIG. 11 begins at Block 1102. At Block 1102, a stator is formed and/or obtained. For example, Block 1102 can be performed by forming and/or obtaining the stator 904 of FIG. 9 described above. In some examples, various components (e.g., a ferromagnetic core, a plurality of teeth, a plurality of windings, etc.) of the stator can be pre-formed, pre-positioned, and/or pre-assembled in connection with Block 1102. Following Block 1102, the method 1100 of FIG. 11 proceeds to Block 1104.

At Block 1104, an inner race strip is mounted on the stator. For example, Block 1104 can be performed by mounting (e.g., coupling via a friction fit, via an adhesive, via one or more weld(s), via one or more fastener(s), etc.) the inner race strip 802 of the raceway bearing assembly 902 on the stator 904 of FIG. 9. In some examples, Block 1104 can be performed by mounting a first portion of the inner race strip 802 on the heatsink 908 of the stator 904 and mounting a second portion of the inner race strip 802 on the seal plate 910 of the stator 904. Following Block 1104, the method 1100 of FIG. 11 proceeds to Block 1106.

At Block 1106, a rotor is formed and/or obtained. For example, Block 1106 can be performed by forming and/or obtaining the rotor 906 of FIG. 9. In some examples, various components (e.g., an inner or outer ferromagnetic ring, an array of permanent magnets, etc.) of the rotor can be pre-formed, pre-positioned, and/or pre-assembled in connection with Block 1106. Following Block 1106, the method 1100 of FIG. 11 proceeds to Block 1108.

At Block 1108, an outer race strip is mounted on the rotor. For example, Block 1108 can be performed by mounting (e.g., coupling via a friction fit, via an adhesive, via one or more weld(s), via one or more fastener(s), etc.) the outer race strip 804 of the raceway bearing assembly 902 on the rotor 906 of FIG. 9. Following Block 1108, the method 1100 of FIG. 11 proceeds to Block 1110.

At Block 1110, balls are mounted and/or positioned on the outer race strip of the rotor. For example, Block 1110 can be performed by mounting and/or positioning the balls 412 of the raceway bearing assembly 902 on the outer race strip 804 of the rotor 906 of FIG. 9. In some examples, positioning the balls on the outer race strip of the rotor in connection with Block 1110 includes retaining the balls as a ring using a standard cage. In other examples, the balls can be mounted and/or positioned on the inner race strip of the stator instead of being mounted and/or positioned on the outer race strip of the rotor. In still other examples, a first subset of the balls can be mounted and/or positioned on the inner race strip of the stator, and a second subset of the balls can be mounted and/or positioned on the outer race strip of the rotor. Following Block 1110, the method 1100 of FIG. 11 proceeds to Block 1112.

At Block 1112, the rotor is assembled relative to the stator. For example, Block 1112 can be performed by positioning the rotor 906 (e.g., including the outer race strip 804 and the balls 412) externally relative to the stator 904 (e.g., including the inner race strip 802) such that the rotor 906 circumscribes the stator 904, as shown for example in FIG. 9. In connection with performing Block 1112, respective ones of the balls 412 of the raceway bearing assembly 902 become located (e.g., centrally located) and/or retained between the inner race strip 802 and the outer race strip 804 of the raceway bearing assembly 902. Various other components (e.g., the first bearing seal 912, the second bearing seal 914, the lip seal 918, etc.) of the electric motor (e.g., the electric motor 900 of FIG. 9) can be mounted on, attached to, and/or assembled in relation to the stator and/or the rotor in connection with Block 1112. Following Block 1112, the method 1100 of FIG. 11 ends.

The following paragraphs provide various examples in relation to the disclosed raceway bearing assemblies for in-wheel outer rotor electric motors.

Example 1 includes an in-wheel electric motor. In Example 1, the in-wheel electric motor includes a stator, a rotor, and a raceway bearing assembly. The rotor circumscribes the stator. The rotor is configured to rotate relative to the stator. The raceway bearing assembly is located between the rotor and the stator. In Example 1, the raceway bearing assembly includes a first inner race wire, a second inner race wire, a first outer race wire, a second outer race wire, and a plurality of balls. The first inner race wire is mounted on the stator. The second inner race wire is mounted on the stator. The second inner race wire is spaced apart from the first inner race wire. The first outer race wire is mounted on the rotor. The first outer race wire is spaced apart from the first inner race wire and second inner race wire. The second outer race wire is mounted on the rotor. The second outer race wire is spaced apart from the first inner race wire, the second inner race wire, and the first outer race wire. Respective ones of the plurality of balls are located between the first inner race wire, the second inner race wire, the first outer race wire, and the second outer race wire.

Example 2 includes the in-wheel electric motor of Example 1. In Example 2, the first inner race wire and the second inner race wire collectively form an inner raceway mounted on the stator. The first outer race wire and the second outer race wire collectively form an outer raceway mounted on the rotor. The respective ones of the plurality of balls are located between the inner raceway and the outer raceway.

Example 3 includes the in-wheel electric motor of Example 1. In Example 3, the stator includes a heatsink and a seal plate. The seal plate is located axially outward from the heatsink. The first inner race wire is mounted on the heatsink and the second inner race wire is mounted on the seal plate.

Example 4 includes the in-wheel electric motor of Example 1. In Example 4, the in-wheel electric motor further includes a bearing seal located between the rotor and the stator at a position that is axially outward from the raceway bearing assembly.

Example 5 includes the in-wheel electric motor of Example 1. In Example 5, the first inner race wire, the second inner race wire, the first outer race wire, and the second outer race wire are collectively arranged to distribute radial loads and axial loads evenly.

Example 6 includes the in-wheel electric motor of Example 1. In Example 6, the first inner race wire, the second inner race wire, the first outer race wire, and the second outer race wire are collectively arranged to distribute radial loads and axial loads in a manner that favors the axial loads.

Example 7 includes the in-wheel electric motor of Example 1. In Example 7, the first inner race wire, the second inner race wire, the first outer race wire, and the second outer race wire are collectively arranged to distribute radial loads and axial loads in a manner that favors the radial loads.

Example 8 includes an in-wheel electric motor. In Example 1, the in-wheel electric motor includes a stator, a rotor, and a raceway bearing assembly. The rotor circumscribes the stator. The rotor is configured to rotate relative to the stator. The raceway bearing assembly is located between the rotor and the stator. In Example 8, the raceway bearing assembly includes an inner race strip, an outer race strip, and a plurality of balls. The inner race strip is mounted on the stator. The outer race strip is mounted on the rotor. The outer race strip is spaced apart from the inner race strip. Respective ones of the plurality of balls are located between the inner race strip and the outer race strip.

Example 9 includes the in-wheel electric motor of Example 8. In Example 9, the stator includes a heatsink and a seal plate. The seal plate is located axially outward from the heatsink. The first portion of the inner race strip is mounted on the heatsink and a second portion of the inner race strip is mounted on the seal plate.

Example 10 includes the in-wheel electric motor of Example 8. In Example 10, the in-wheel electric motor further includes a bearing seal located between the rotor and the stator at a position that is axially outward from the raceway bearing assembly.

Example 11 is a method for assembling an in-wheel electric motor. In Example 11, the method includes mounting a first inner race wire on a stator of the in-wheel electric motor. The method further includes mounting a second inner race wire on the stator, wherein the second inner race wire is spaced apart from the first inner race wire. The method further includes mounting a first outer race wire on a rotor of the in-wheel electric motor, wherein, the first outer race wire is spaced apart from the first inner race wire and second inner race wire. The method further includes mounting a second outer race wire on the rotor, wherein the second outer race wire is spaced apart from the first inner race wire, the second inner race wire, and the first outer race wire. The method further includes mounting a plurality of balls on the rotor between the first outer race wire and the second outer race wire. The method further includes assembling the rotor relative to the stator such that respective ones of the plurality of balls are located between the first inner race wire, the second inner race wire, the first outer race wire, and the second outer race wire.

Example 12 includes the method of Example 11. In Example 12, the first inner race wire and the second inner race wire collectively form an inner raceway mounted on the stator. The first outer race wire and the second outer race wire collectively form an outer raceway mounted on the rotor. The respective ones of the plurality of balls are located between the inner raceway and the outer raceway.

Example 13 includes the method of Example 11. In Example 13, mounting the first inner race wire on the stator includes mounting the first inner race wire on a heatsink of the stator. In Example 13, mounting the second inner race wire on the stator includes mounting the second inner race wire on a seal plate of the stator.

Example 14 includes the method of Example 11. In Example 14, assembling the rotor relative to the stator includes locating a bearing seal between the rotor and the stator at a position that is axially outward of the first inner race wire, the second inner race wire, the first outer race wire, and the second inner race wire.

Example 15 includes the method of Example 11. In Example 15, the first inner race wire, the second inner race wire, the first outer race wire, and the second outer race wire are collectively arranged to distribute radial loads and axial loads evenly.

Example 16 includes the method of Example 11. In Example 16, the first inner race wire, the second inner race wire, the first outer race wire, and the second outer race wire are collectively arranged to distribute radial loads and axial loads in a manner that favors the axial loads.

Example 17 includes the method of Example 11. In Example 17, the first inner race wire, the second inner race wire, the first outer race wire, and the second outer race wire are collectively arranged to distribute radial loads and axial loads in a manner that favors the radial loads.

Example 18 is a method for assembling an in-wheel electric motor. In Example 18, the method includes mounting an inner race strip on a stator of the in-wheel electric motor. The method further includes mounting an outer race strip on a rotor of the in-wheel electric motor, wherein the outer race strip is spaced apart from the inner race strip. The method further includes mounting a plurality of balls on the outer race strip. The method further includes assembling the rotor relative to the stator such that respective ones of the plurality of balls are located between the inner race strip and the outer race strip.

Example 19 includes the method of Example 18. In Example 19, the stator includes a heatsink and a seal plate. The seal plate is located axially outward from the heatsink. In Example 19, mounting the inner race strip on the stator includes mounting a first portion of the inner race strip on the heatsink and mounting a second portion of the inner race strip on the seal plate.

Example 20 includes the method of Example 18. In Example 20, assembling the rotor relative to the stator includes locating a bearing seal between the rotor and the stator at a position that is axially outward of the inner race strip and the outer race strip.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An in-wheel electric motor, comprising:

a stator including a heat sink and a seal plate, the seal plate located axially outward from the heatsink;

a rotor circumscribing the stator, the rotor configured to rotate relative to the stator; and a raceway bearing assembly located between the rotor and the stator, the raceway bearing assembly including:

a first inner race wire mounted on the heat sink of the stator;

a second inner race wire mounted on the seal plate of the stator, the second inner race wire spaced apart from the first inner race wire;

a first outer race wire mounted on the rotor, the first outer race wire spaced apart from the first inner race wire and second inner race wire;

a second outer race wire mounted on the rotor, the second outer race wire spaced apart from the first inner race wire, the second inner race wire, and the first outer race wire; and a plurality of balls located between the first inner race wire, the second inner race wire, the first outer race wire, and the second outer race wire.

2. The in-wheel electric motor of claim 1, wherein the first inner race wire and the second inner race wire collectively form an inner raceway mounted on the stator, wherein the first outer race wire and the second outer race wire collectively form an outer raceway mounted on the rotor, and wherein respective ones of the plurality of balls are located between the inner raceway and the outer raceway.

3. The in-wheel electric motor of claim 1, further comprising a bearing seal located between the rotor and the stator at a position that is axially outward from the raceway bearing assembly.

4. The in-wheel electric motor of claim 1, wherein the first inner race wire, the second inner race wire, the first outer race wire, and the second outer race wire are collectively arranged to distribute radial loads and axial loads evenly.

5. The in-wheel electric motor of claim 1, wherein the first inner race wire, the second inner race wire, the first outer race wire, and the second outer race wire are collectively arranged to distribute radial loads and axial loads in a manner that favors the axial loads.

6. The in-wheel electric motor of claim 1, wherein the first inner race wire, the second inner race wire, the first outer race wire, and the second outer race wire are collectively arranged to distribute radial loads and axial loads in a manner that favors the radial loads.

7. A method for assembling an in-wheel electric motor, the method comprising:

mounting a first inner race wire on a heat sink of a stator of the in-wheel electric motor;

mounting a second inner race wire on a seal plate of the stator, the seal plate located axially outward from the heatsink, the second inner race wire spaced apart from the first inner race wire;

mounting a first outer race wire on a rotor of the in-wheel electric motor, the first outer race wire spaced apart from the first inner race wire and second inner race wire;

mounting a second outer race wire on the rotor, the second outer race wire spaced apart from the first inner race wire, the second inner race wire, and the first outer race wire;

mounting a plurality of balls on the rotor between the first outer race wire and the second outer race wire; and assembling the rotor relative to the stator such that respective ones of the plurality of balls are located between the first inner race wire, the second inner race wire, the first outer race wire, and the second outer race wire, and such that the rotor circumscribes the stator.

8. The method of claim 7, wherein the first inner race wire and the second inner race wire collectively form an inner raceway mounted on the stator, wherein the first outer race wire and the second outer race wire collectively form an outer raceway mounted on the rotor, and wherein respective ones of the plurality of balls are located between the inner raceway and the outer raceway.

9. The method of claim 7, wherein assembling the rotor relative to the stator includes locating a bearing seal between the rotor and the stator at a position that is axially outward of the first inner race wire, the second inner race wire, the first outer race wire, and the second inner race wire.

10. The method of claim 7, wherein the first inner race wire, the second inner race wire, the first outer race wire, and the second outer race wire are collectively arranged to distribute radial loads and axial loads evenly.

11. The method of claim 7, wherein the first inner race wire, the second inner race wire, the first outer race wire, and the second outer race wire are collectively arranged to distribute radial loads and axial loads in a manner that favors the axial loads.

12. The method of claim 7, wherein the first inner race wire, the second inner race wire, the first outer race wire, and the second outer race wire are collectively arranged to distribute radial loads and axial loads in a manner that favors the radial loads.

* * * * *